(12) United States Patent
Sato et al.

(10) Patent No.: US 6,512,638 B2
(45) Date of Patent: Jan. 28, 2003

(54) STEP ZOOM LENS CAMERA

(75) Inventors: Norio Sato, Tokyo (JP); Shinichiro Ishii, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/941,641

(22) Filed: Aug. 30, 2001

(65) Prior Publication Data

US 2002/0024747 A1 Feb. 28, 2002

(30) Foreign Application Priority Data

Aug. 31, 2000 (JP) ........................................ 2000-264111

(51) Int. Cl.⁷ ............................................... G02B 15/14
(52) U.S. Cl. ....................................... 359/701; 359/700
(58) Field of Search ................................. 359/700, 701, 359/697, 698; 396/77, 82

(56) References Cited

U.S. PATENT DOCUMENTS 5,162,831 A  * 11/1992 Haraguchi et al. .......... 396/148
5,196,880 A  *  3/1993 Ishibashi et al. ............. 396/78
5,633,763 A  *  5/1997 Suzuki et al. ................ 359/601
6,268,964 B1     7/2001 Ozaki et al. ................. 359/685

FOREIGN PATENT DOCUMENTS

JP         2000199843        7/2000

* cited by examiner

*Primary Examiner*—Ricky Mack
(74) *Attorney, Agent, or Firm*—Greenblum & Bernstein, P.L.C.

(57) ABSTRACT

A step zoom lens camera having a zoom lens and a cam ring provided with a cam groove having step portions. The zoom lens camera includes a focusing lens group which serves also as a variable power lens group of the zoom lens; and an adjusting lens group, serving also as another variable power lens group of the zoom lens, which is guided by the cam groove and is moved in the optical axis direction in a non-linear relationship with respect to the rotation angle of the cam ring in each focal length step. The step portions of the cam groove are each provided with a path which enables the adjusting lens group to move so as to provide a linear relationship between the rotation angle of the cam ring and amount of movement of the focal position of an infinite distance object.

6 Claims, 13 Drawing Sheets

STEP ZOOM LENS CAMERA

BACKGROUND OF THE INVENTION

1. Field of the Invention

The present invention relates to a step zoom lens camera in which a focusing operation is carried out by controlling the angular displacement of a cam ring having a cam groove.

2. Description of the Related Art

In classical zoom lenses, upon zooming, a plurality of variable power lens groups are moved along predetermined zoom path, so that the focal length can be varied without moving the focal position. In a shutter release operation, a focusing lens group is moved in accordance with the object distance. The focusing lens group is either provided separately from the variable power lens groups or is formed by one of the variable power lens groups. Classical zoom lenses of this kind have been used for a mechanical zoom lens in which a cam ring having cam grooves is manually or electrically rotated in a stepless fashion.

A step zoom lens has been used for a lens in which the angular displacement of the cam ring with cam grooves is pulse-controlled. In such a step zoom lens, the focal length from the telephoto extremity to the wide angle extremity is divided into a plurality of (finite number of) focal length steps. The angular displacement of the cam ring is controlled at each focal length step so as to focus on an object of any distance between the infinite object distance and the minimum (closest) object distance, during the focusing operation while the zooming operation is carried out. The angular distance of the cam ring is pulse-controlled so that the object is in-focus in accordance with the focal length belonging to a specific focal length step determined in accordance with object distance data.

In the step zoom lens, if a focusing table which shows the relationship between the object distance and the focal length is stored, it is possible to calculate the angular displacement of the cam ring with respect to the current angular position thereof when the shutter is released, so as to coincide with the object distance. Therefore, the focusing can be carried out, regardless of the profile of the cam groove. Accordingly, each step portion thereof (corresponding to a focal length step) is formed linearly in a conventional cam groove. However, if each step portion of the cam groove is made linear (or substantially linear), the relationship of the angular displacement of the cam ring and the movement of the image surface is non-linear, and thus, control thereof is difficult. For example, in the step zoom lens in which the pulse-control of the angular displacement of the cam ring can be performed, the zooming adjustment (to make the focal position at each focal length identical) or the backfocus adjustment (to make the focal position coincident with the image pickup surface (film surface)) can be carried out by setting (adjusting) the angular displacement of the cam ring. If the relationship between the angular displacement of the cam ring and the movement of the image surface in each focal length step is non-linear, the calculation of the number of pulses including backfocus adjustment during the focusing operation is made particularly complicated. If the pulse calculation is complicated, the burden of the control system of the CPU or memory is increased.

SUMMARY OF THE INVENTION

It is an object of the present invention to provide a reliable step zoom lens camera in which the burden of the control system during the focusing operation or adjustment is reduced and the focusing can be precisely carried out.

To achieve the object, according to the present invention, a step zoom lens camera is provided, having a zoom lens and a cam ring which is rotated to vary the focal length of the zoom lens, the cam ring being provided with a cam groove including a finite number of step portions which correspond to a plurality of focal length steps defined between a telephoto extremity and a wide angle extremity of the zoom lens, so that an object from an infinite distance to a closest distance can be focused on by changing the rotation angle of the cam ring in each the focal length step while varying the focal length of the zoom lens. The step zoom lens camera includes a focusing lens group which serves also as a variable power lens group of the zoom lens, wherein the focusing lens group is moved in the optical axis direction, while keeping a linear relationship with respect to the rotation angle of the cam ring in each focal length step, in accordance with the rotation of the cam ring; and an adjusting lens group, serving also as another variable power lens group of the zoom lens, which is guided by the cam groove and is moved in the optical axis direction in a non-linear relationship with respect to the rotation angle of the cam ring in each focal length step, in accordance with the rotation of the cam ring. The step portions are each provided with a path which enables the adjusting lens group to move so as to provide a linear relationship between the rotation angle of the cam ring (i.e., amount of movement of the focusing lens group) and amount of movement of the focal position of an infinite distance object.

In an embodiment, the cam groove is provided with a path which enables the adjusting lens group to move wherein a rotational angular displacement of the cam ring and the displacement of the focal position are equal in each of the focal length step portions.

Preferably, a position of the focusing lens group is adjustable in the optical axis direction, relative to the cam ring while the cam ring is stationary, so that a zooming adjustment to make the focal position equal in each focal length step is carried out by adjusting the position of the focusing lens group, wherein the focusing lens group and the adjusting lens group are moved along predetermined paths in accordance with the rotation of the cam ring during the focusing operation, in order to perform a backfocus adjustment to thereby make the focal position equal to an image surface of the step zoom lens camera.

In an embodiment, the zoom lens includes two lens groups including the focusing lens group and the adjusting lens group, wherein the focusing lens group includes a front lens group located on the object side, and the adjusting lens group includes a rear lens group located on the image surface side.

In an embodiment, a cam groove for guiding the adjusting lens group and a female helicoid are provided on inner peripheral surface of the cam ring. The focusing lens group is supported by a movable barrel having a male helicoid which is engaged with the female helicoid, the movable barrel being guided to move linearly in the optical axis direction.

Preferably, a mechanical adjusting device is further provided for adjusting the position of the focusing lens group in the optical axis direction with respect to the movable barrel.

The present disclosure relates to subject matter contained in Japanese Patent Application No. 2000-264111 (filed on Aug. 31, 2000) which is expressly incorporated herein by reference in its entirety.

BRIEF DESCRIPTION OF THE DRAWINGS

The invention will be discussed below with reference to the drawings, in which.

DESCRIPTION OF THE PREFERRED EMBODIMENTS

Figure 1:
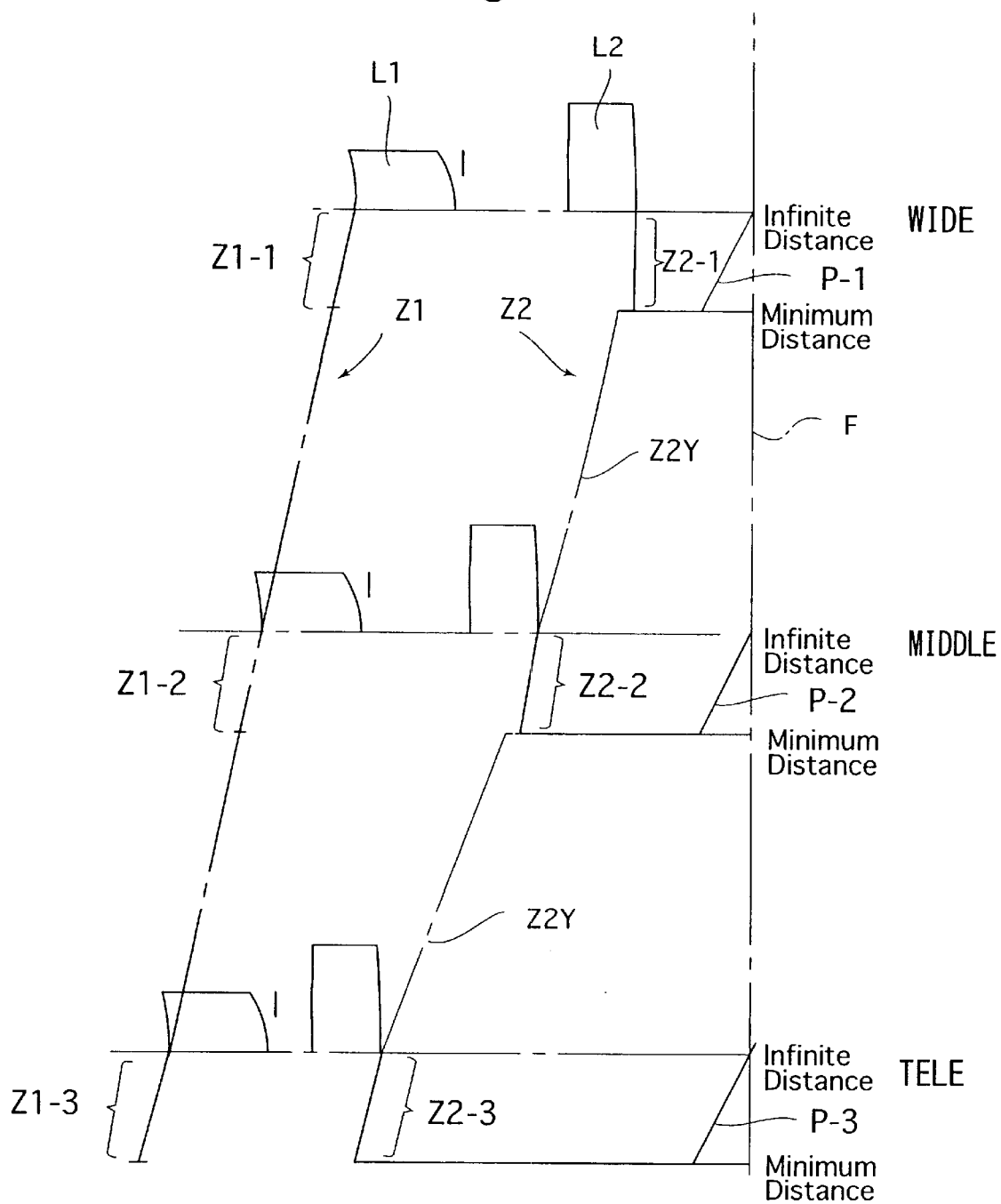
FIG. 1 is a schematic view of a zooming path (cam groove profile) in a step zoom lens camera applied to a two-lens group type zoom lens, according to the present invention.

The basic concept of the present invention will be discussed below with reference to FIG. 1 which shows an embodiment of the present invention. In this embodiment, a two-lens group zoom lens is provided, having a first variable power lens group (focusing lens group) L1 and a second variable power lens group (adjusting lens group) L2. The zoom lens has three focal length steps including a wide angle extremity (WIDE), a middle length (MIDDLE) and a telephoto extremity (TELE). For the sake of simplicity, it is assumed that the first lens group L1 and the second lens group L2 are linearly moved in the optical axis direction, and a single cam ring is provided with zooming cam grooves Z1 and Z2 to guide the first and second lens groups L1 and L2. The angular position of the cam ring which is rotated is pulse-controlled.

The zooming cam groove Z1 which guides the first lens group L1 is provided with a zoom path which linearly increases or decreases the distance from the film surface (image pickup surface) F by each step groove ($Z1$-$i$ (i=1 to 3)) when the object distance is $\infty$ at each of the three focal length steps, i.e., the wide angle extremity closest to the film surface F, a middle distance, and the telephoto extremity farthest from the film surface F. In other words, in each focal length step, the displacement of the first lens group L1 in the optical axis direction has a linear relationship with respect to the angular distance of the cam ring.

The zooming cam groove Z2 for the second lens group L2 has a non-linear profile so that the profile of the step grooves (step portions) $Z2$-$i$ (i=1 to 3) corresponding to the wide angle extremity, the middle distance and the telephoto extremity, is deviated from the classical zooming path, i.e., an imaginary zooming path which is adapted to continuously vary the focal length by the first lens group L1 without varying the focal position, at an infinite object distance. In other words, in each focal length step, the displacement of the second lens group L2 in the optical axis direction has a non-linear relationship to the angular displacement of the cam ring. Transfer areas $Z2y$ are provided in between the step grooves $Z2$-$i$.

In the cam structure constructed as above, when the cam ring rotates, the first lens group L1 is moved in accordance with the profile of the zooming cam groove Z1 and the second lens group L2 is moved in accordance with the profile of the zooming cam groove Z2. The first lens group L1 is guided so that the displacement thereof in the optical axis direction and the angular displacement of the cam ring exhibit a linear relationship in the transfer area between the step groves $Z1$-$i$. The transfer areas $Z2y$ between the step grooves $Z2$-$i$ function so as to guide the second lens group L2 as close as possible to the above-mentioned imaginary zooming path.

When the first and second lens groups L1 and L2 pass a transfer area and reach a step portion (i.e., a corresponding step groove $Z1$-$i$ or $Z2$-$i$), focusing is carried out together with zooming, in accordance with the rotation of the cam ring. For example, if the cam ring is rotated at the angle position of the wide angle extremity step, the first lens group L1 is moved in accordance with the profile of the step groove $Z1$-$1$ of the zooming cam groove Z1, by a displacement which varies in a linear relationship to the angular displacement of the cam ring. The second lens group L2 is moved to vary the relative position with respect to the first lens group L1, in accordance with the profile of the step groove $Z2$-$1$ of the zooming cam groove Z2, by a displacement which varies in a non-linear relationship to the angular displacement of the cam ring. Due to the change in the relative position between the first and second lens groups L1 and L2, an object from the infinite distance ($\infty$) to the minimum (closest) distance (close-up) can be focused on in the wide angle extremity step. Although the above discussion has been addressed to the wide angle extremity step, a focusing operation on an object of the infinite distance or the minimum distance can be equally carried out by controlling the angular displacement of the cam ring in the middle distance step or in the telephoto extremity step. Note that the focal length changes in each focal length step during focusing, however, the focal length does not equal that of an adjacent step thereof. For example, the focal length at the minimum distance of the wide angle extremity step does not equal the focal length at the infinite distance of the middle distance step. Moreover, the cam ring is not stopped in the transfer area.

As mentioned above, in the zoom lens shown in FIG. 1, the first and second lens groups L1 and L2, that constitute variable power lens groups which are moved along predetermined zooming paths in accordance with the rotation of the cam ring, are relatively moved in the optical axis direction in the focal length steps split into the finite stages by further rotation of the cam ring, and focusing and zooming can be carried out by controlling the cam ring. In practice, in the actual lens barrel structure, it is inconvenient or restrictive to form the zooming cam grooves Z1 and Z2 on a single cam ring. Rather, it is preferable that the cam ring be provided with the zooming cam groove Z2 only. For the first lens group L1, the above-mentioned operation can be carried out by a helicoid feed device.

In the zoom lens barrel shown in FIG. 1, the cam ring can be either of a type in which the cam ring is moved in the optical axis direction in accordance with the rotation thereof or of a type in which no axial movement of the cam ring takes place when it is rotated. Namely, the invention can be applied to any type of lens barrel, in which the first and second lens groups L1 and L2 are moved as described above, when the cam ring is rotated.

The present invention concerns the improvement of the profile of the step groove Z2-$i$ of the zooming cam groove Z2. Namely, the step groove Z2-$i$ is formed so that when the first lens group L1 is moved in the optical axis direction in accordance with the profile of the zooming cam groove Z1 to carry out a focusing operation, the displacement of the first lens group L1, i.e., the angular displacement of the cam ring (the number of drive pulses) and the displacement of a focal point (image surface) P-$i$ with respect to an object at infinity (object of constant distance) in the step groove Z2-$i$ have a linear relationship. Note that P-$i$ (i=1 to 3) in FIG. 1 represents the point at which an object at infinity is in focus when the cam ring is rotated from the infinite distance to the minimum distance in each focal length step.

Figure 2:
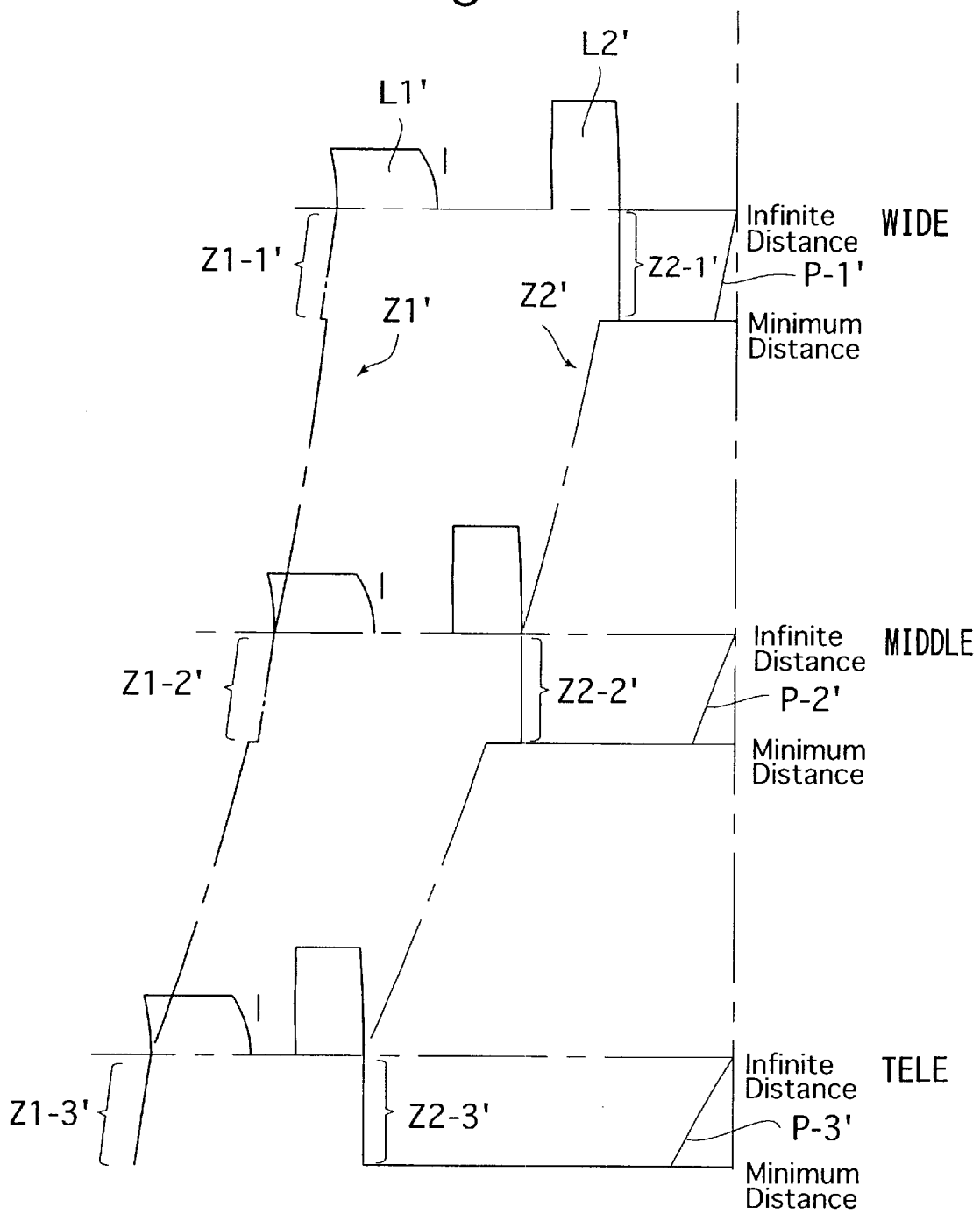
FIG. 2 is a schematic view of a comparative example of a zoom path for two-lens groups, corresponding to that shown in FIG. 1.

Before discussing the mode of operation of the present invention, problems that would occur if the relationship between the number of the drive pulses with respect to the cam ring and the displacement of the focal point with respect to an object of a constant distance were non-linear. FIG. 2 shows a comparative example. In the comparative example, a zooming cam groove Z1' is formed so that the relationship between the angular displacement of the cam ring and the displacement of a first lens group L1' in a step groove Z1-$i'$ (i =1 to 3) is linear, similar to the previous embodiments of the present invention. The zooming cam groove Z1' can be replaced with helicoids or the like. A second lens group L2' is guided by a step groove Z2-$i'$ of a zooming cam groove Z2' so as not to vary the distance of the second zoom lens group L2' from the film surface F in each focal length step. In the case of a zoom lens in which the cam ring is rotated without moving in the optical axis direction, the step groove Z2-$i'$ is provided as a linear cam groove which extends in the circumferential direction of the cam ring to be parallel with the direction of the rotation of the cam ring. In the case of a zoom lens in which the cam ring is rotated while moving in the optical axis direction, the step groove Z2-$i'$ is provided as a linear cam groove which is inclined in a direction opposite to the rotation and feed direction of the cam ring.

In the comparative example, the second lens group L2' is not moved in the optical axis direction within each focal length step, and only the first lens group L1' is moved in the optical axis direction to solely constitute the focusing lens group to carry out the focusing operation. If the focusing lens group (first lens group L1') is moved without moving the second lens group L2' in each focal length step, the relationship between the number of the drive pulses of the cam ring and the displacement of the focal point P-$i'$ (i=1 to 3) in each focal length step is non-linear. This relationship is represented by the following expression:

$$\Delta P(m)/\Delta Xi = Mj^2 - Mi^2 \cdot Mj^2 \ (m)$$

wherein $\Delta P(m)$ designates the displacement of the image surface at a lateral magnification m; $\Delta Xi$ designates the displacement of the first lens group; Mi designates the lateral magnification of the focusing lens group (first lens group L1'); and Mj designates the lateral magnification of the lens groups (second lens group L2') on the image side of the focusing lens group (first lens group L1').

Figure 3:
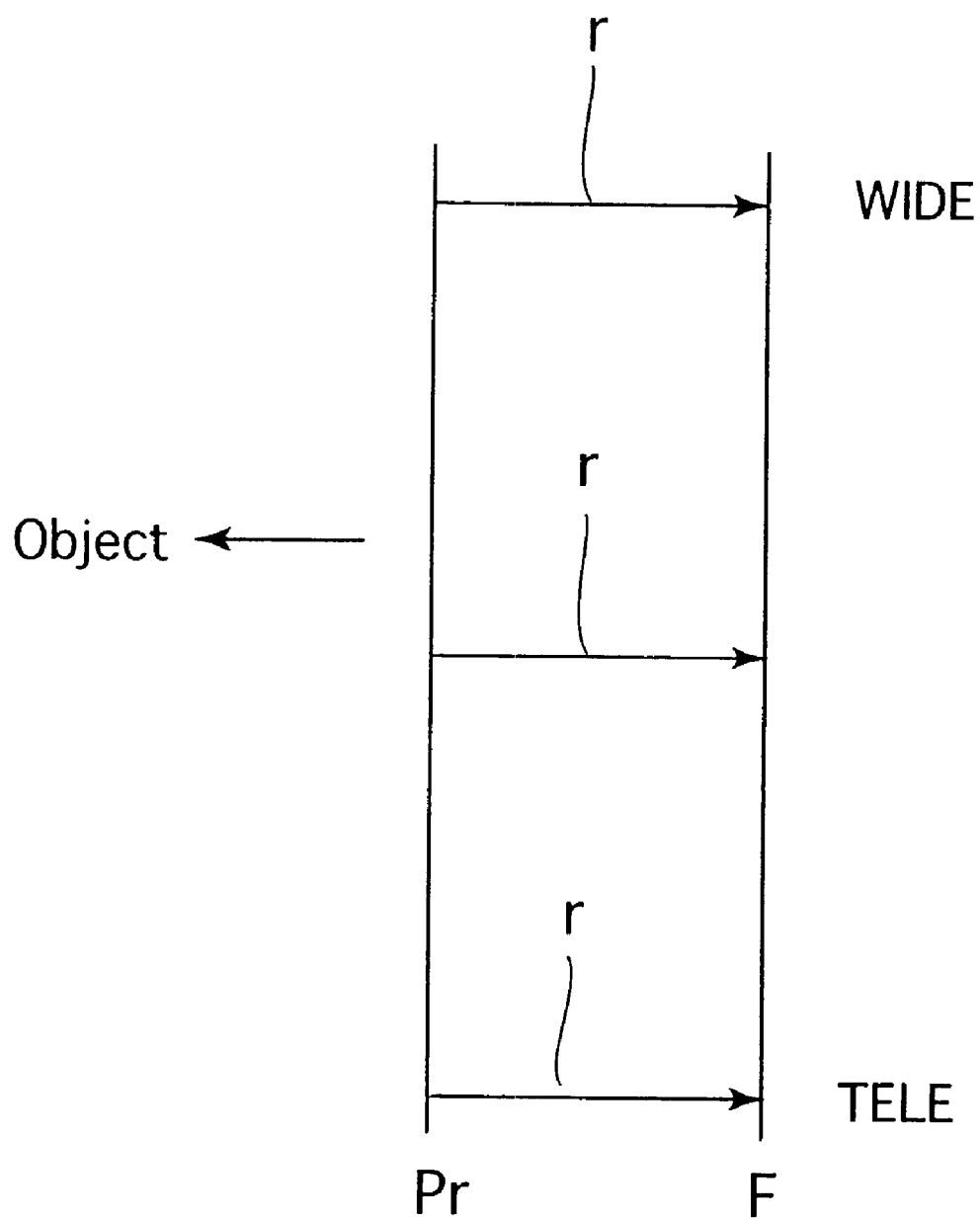
FIG. 3 is a conceptual view of an backfocus adjustment.

As mentioned above, in the step zoom lens camera, the focus adjustment can be carried out by setting the rotation angle of the cam ring. However, if the displacement of the focal position per pulse is non-linear, the calculation to convert the focus correction into the pulse-controlled angular displacement of the cam ring is complicated. For example, in a zoom lens, assuming that the focal point with respect to the film surface F is designated as Pr, as shown in FIG. 3, the backfocus adjustment is carried out to move the focal point Pr, whose deviation r from the film surface F is constant, to the film surface F to thereby make the focal point with the film surface. If the displacement of the focal point Pr per pulse within a focal length step is non-linear, it is necessary to divide the displacement of the focal point P-$i'$ which is varied non-linearly into smaller steps, approximate the variation of the displacement to a line, obtain the gradient in the divided steps and determine the angular displacement of the cam ring corresponding to the backfocus adjustment amount (r), in accordance with the gradient and the object distance. Consequently, it is necessary to perform complex calculations or store various data in a memory, thus resulting in an increase in the burden of the control system.

In comparison with the comparative example shown in FIG. 2, the significant feature of the present invention resides in the correction of the movement of the second lens group L2 in order to make the path of the movement of the focal point linear if the path of the movement of the focal point (for an object at infinity) is non-linear with respect to the displacement of the first lens group L1 when the first lens group L1 is moved within a focal length step during a focusing operation. Namely, the second lens group L2 is moved in accordance with the step groove Z2-$i$ so that the displacement of the first lens group L1 and the movement of the focal point (for an object at infinity) have a linear relationship. The linear relationship is represented by the straight line P-$i$ (i=1 to 3) which represents the movement of the focal point in each focal length step in FIG. 1.

To correct the movement of the second lens group L2, it is necessary to form each step groove Z2-$i$ of the zooming cam groove so as to satisfy the following equation in which K is constant. Note that the value of K can be different depending on the focal length step. If the constant K in the focal length steps are different, the gradients of the lines P-1, P-2 and P-3 with respect to the film surface F in FIG. 1 are different.

$$\Delta P(m)/\Delta Xi = K$$

wherein $\Delta P(m)$ designates the displacement of the image surface at a lateral magnification of m; and $\Delta Xi$ designates the displacement of the first lens group.

If the profile of the step grooves Z2-$i$ of the zooming cam groove Z2 is determined as described above, the relationship between the angular displacement of the cam ring and the movement of the image surface in each focal length step is linear, and hence, the calculation of the number of drive pulses to perform the focus adjustment, and in particular, the backfocus adjustment in accordance with the rotation of the cam ring can be simplified. More specifically, assuming that the focal point with respect to the film surface F before the backfocus adjustment is carried out is Pr, as shown in FIG. 3, since the amount of movement r for moving the focal point Pr to the film surface F and the angular displacement of the cam ring within a focal length step have a linear relationship, the angular displacement of the cam ring to make the focal point Pr coincide with the film surface F in the focal length step is constant. For instance, in the wide angle extremity step, as shown in FIG. 1, if the number of pulses necessary for the backfocus adjustment at the infinite distance (∞) is 10, the number of pulses necessary for the backfocus adjustment at any object distance from the infinite distance to the minimum distance is 10. Namely, since the movement of the image surface F per pulse is constant, the number of pulses necessary for the backfocus adjustment, which is constant, is added to or subtracted from the number of pulses for the focusing adjustment, corresponding to the object distance in each focal length step to carry out the backfocus adjustment. Thus, the calculation to eventually determine the number of pulses can be easily performed. In the actual control operation, it is possible to incorporate the number of pulses for the backfocus adjustment in advance in a formula which determines the number of pulses for focusing, depending on the object distance.

The step grooves Z2-*i* in FIG. 1 extend between the focal positions for the infinite distance and the minimum distance. However, the zooming cam groove Z2 is provided with adjustment areas for the focus adjustment on opposite sides of the step groove Z2-*i*. The adjustment areas provide a zoom path which permits the second lens group L2 to move in the optical axis direction without sacrificing the focusing function of the step groove Z2-*i*. Backfocus adjustment is carried out using these adjustment areas. The adjustment areas guide the second lens group L2 so that the angular displacement of the cam ring and the displacement of the focal point have a linear relationship, as in the step groove Z2-*i*. Namely, the adjustment areas and the step groove Z2-*i* constitute an actual step portion (effective cam groove area) of the zooming cam groove Z2. The adjustment areas of the zooming cam groove will be discussed in more detail hereinafter.

Although, in the above description, attention has been placed on the linear relationship of the angular displacement of the cam ring and the amount of movement of the focal point within the same focal length step, it is possible to form the step grooves Z2-*i* of the zooming cam groove Z2 so that the rotational angular displacement of the cam ring and the displacement of the focal point are identical in a plurality of focal length steps. Namely, the cam profile is determined so that in FIG. 1, the gradients of the lines P-1, P-2 and P-3 which represent the movement of the focal point, with respect to the film surface F, are identical. To obtain this cam profile, for example, the profile of the step groove Z2-*i* is determined so that K in the previous formula: $\Delta P(m)/\Delta Xi = K$, which represents the step groove Z2-*i*, is constant in several divided steps. With the step groove Z2-*i* having such a profile, the movement of the focal point when the rotation of the cam ring by the same angular displacement occurs is identical in the wide angle extremity step, the middle step, and the telephoto extremity step, and hence, the focus control including the backfocus adjustment can be carried out with less complexity.

In the zoom lens barrel according to the illustrated embodiment, the zooming adjustment to make the focal position identical to each other in a plurality of focal length steps can be carried out in theory by the movement of the second lens group L2 in accordance with the path of the zooming cam groove Z2. However, in order to make the control simpler, it is preferable that the zooming adjustment is carried out by the adjustment of the mechanical arrangement of the first lens group L1. If another linear movement cylinder connected to the cam ring which guides the second lens group L2 through helicoids is provided, the first lens group L1 is supported in this linear movement cylinder wherein the position of the first lens group L1 is adjustable in the optical axis direction. Thus, the zooming adjustment can be carried out only by moving the first lens group L1 in the optical axis direction. Consequently, the areas of the zooming cam groove Z2 used to adjust the focal point can be reduced, so that the focusing and the backfocus adjustment can be performed while still maintaining room within the corresponding step groove Z2-*i*.

The present invention can be generally applied to a step zoom lens of a camera in which step zooming is carried out by rotating the cam ring having the zooming cam groove Z2 in accordance with pulse control. The structure to achieve such a step zoom lens is not limited to a specific structure. The following description will be addressed to an example of the mechanical arrangement applied to a two-lens group zoom lens with reference to FIGS. 4 through 13. In the following explanation, the optical axis direction or direction parallel with the optical axis refers to a direction along the optical axis O of the photographing lens (two-lens group zoom lens) of an assembled camera.

Figure 9:
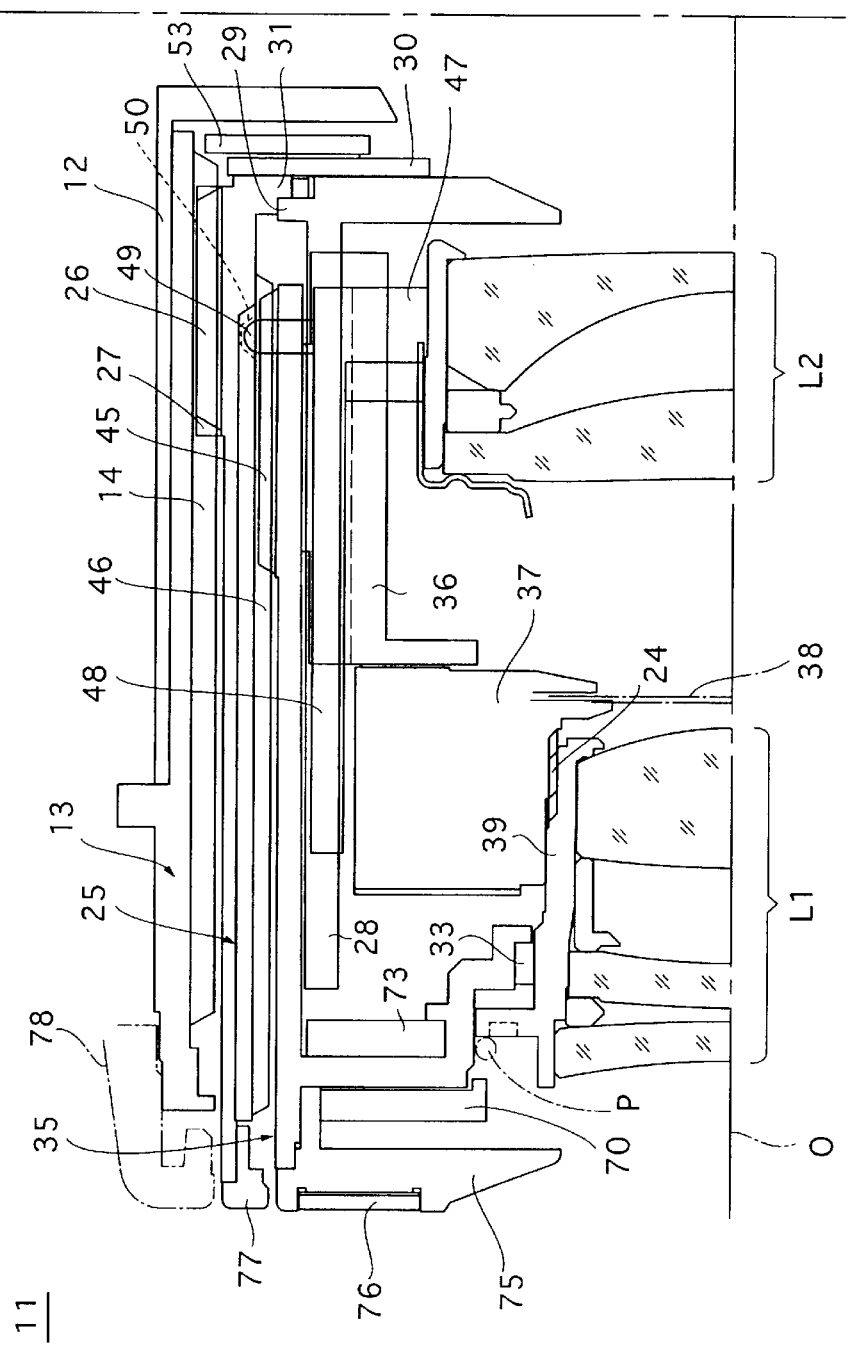
FIG. 9 is a sectional view of an upper half of a zoom lens barrel shown in FIG. 4, in a retracted position thereof.
Figure 10:
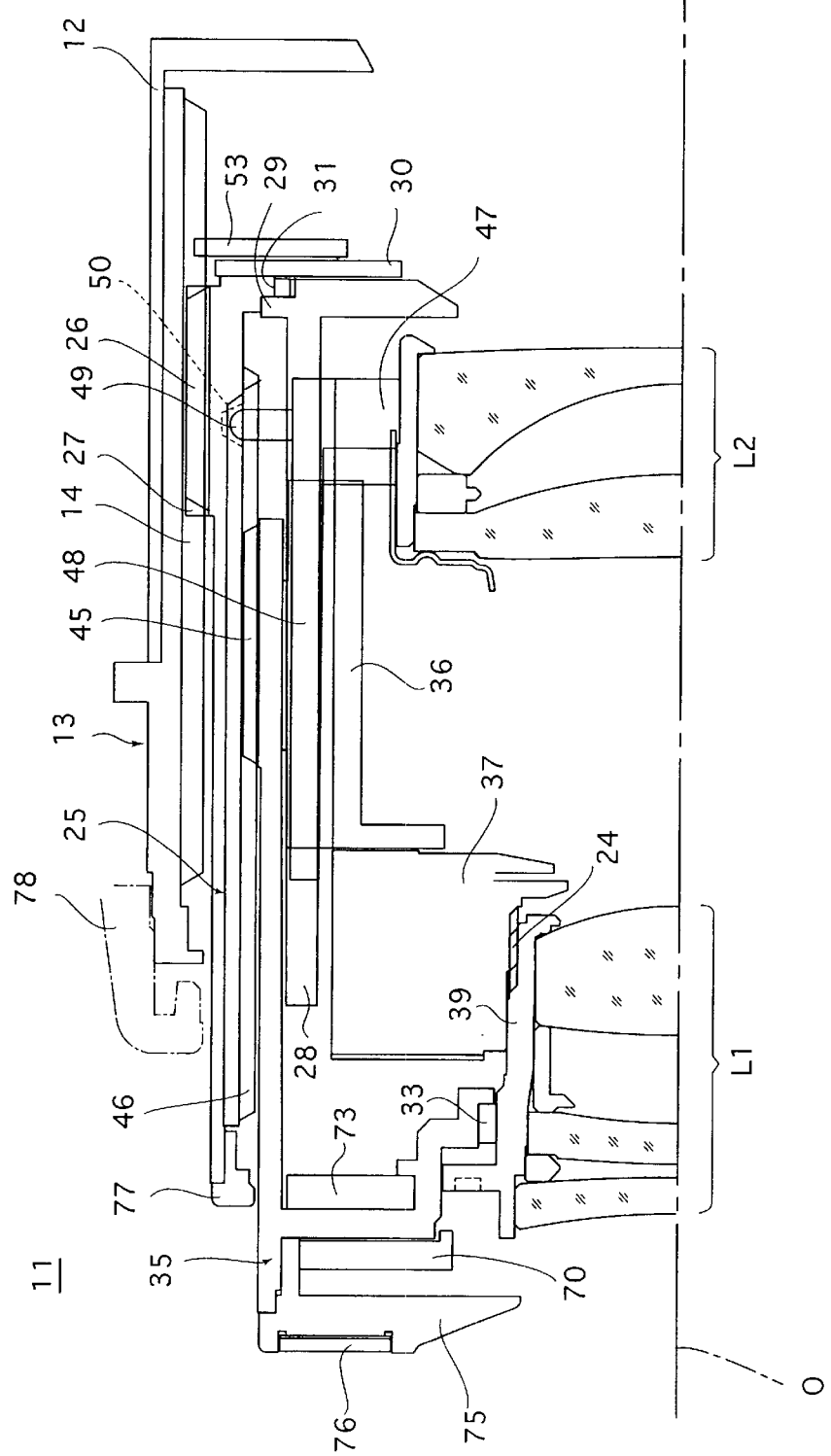
FIG. 10 is a sectional view of an upper half of a zoom lens barrel shown in FIG. 4, in a wide angle position.
Figure 11:
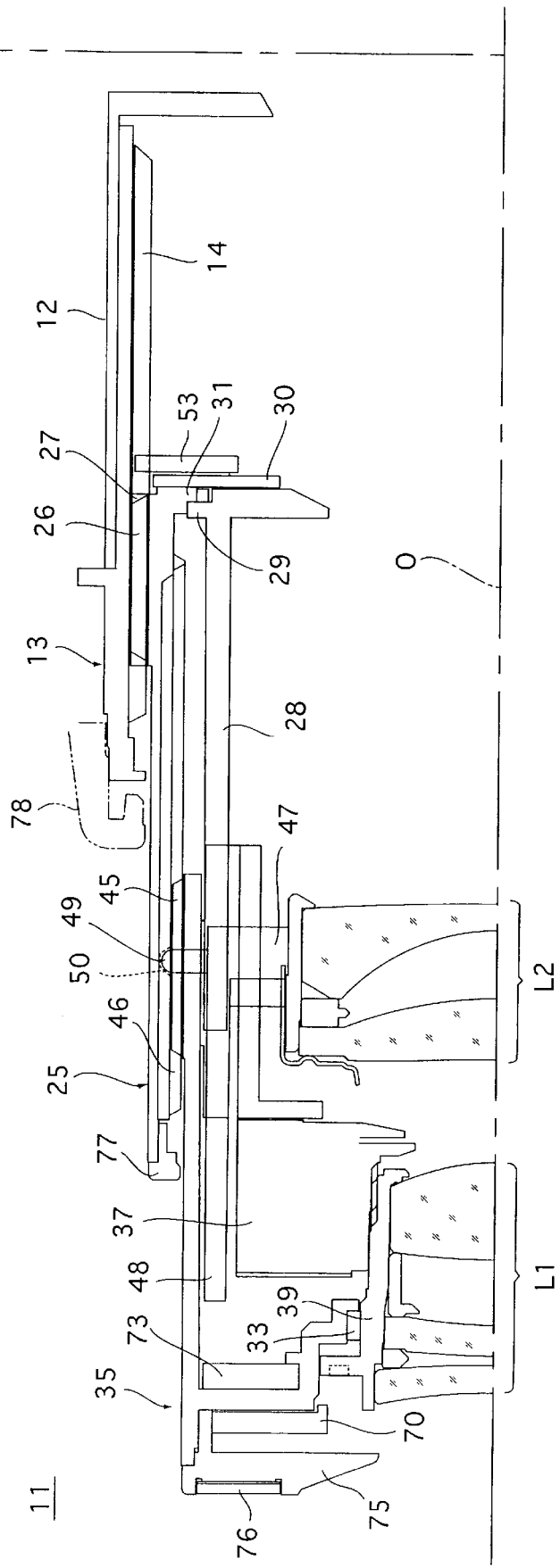
FIG. 11 is a sectional view of an upper half of a zoom lens barrel shown in FIG. 4, in a telephoto position.

As shown in FIGS. 9, 10 and 11, the step zoom lens camera is provided with a housing 12 secured thereto, which is a major member of the zoom lens barrel 11. A stationary barrel 13 is secured in the housing 12 which is secured to the camera body. The stationary barrel 13 has provided on the inner peripheral surface thereof with a female helicoid 14 (see FIGS. 9, 10 and 11) which is partly cut to form a pair of linear movement guide grooves 15 parallel with the optical axis O.

Figure 6:
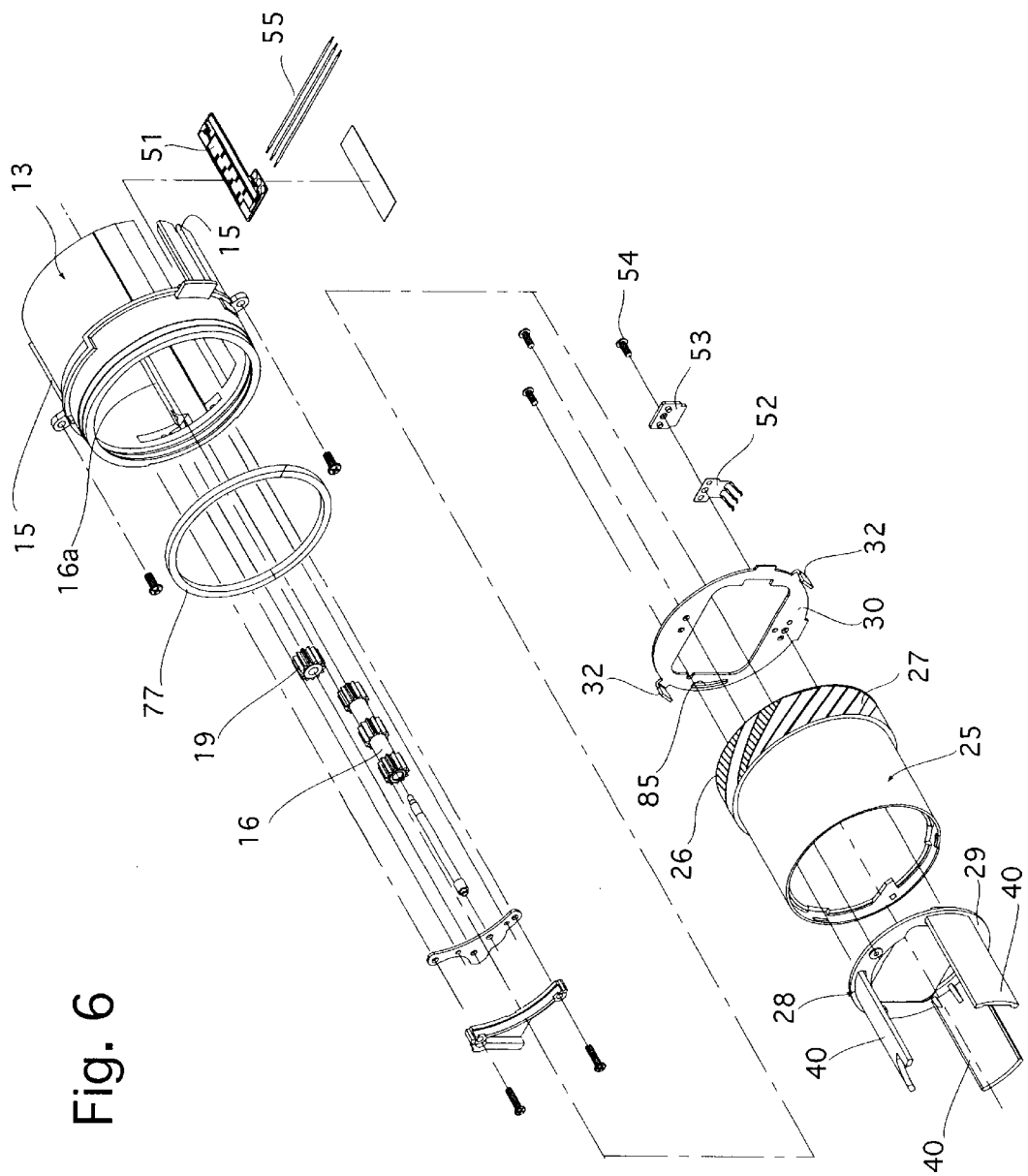
FIG. 6 is an enlarged exploded perspective view of a part of a zoom lens barrel shown in FIG. 4.

As shown in FIG. 6, the stationary barrel 13 is provided with an elongated cut-away portion 16*a* which extends in the optical axis direction, wherein a multiple pinion 16 is installed in the cut-away portion 16*a*. The multiple pinion 16 is supported to rotate about an axis parallel with the optical axis O and is provided with a tooth surface which projects into the stationary barrel 13. A zoom motor 18 is attached to the housing 12 via a motor support plate 17. The rotation of the drive shaft of the zoom motor 18 is transmitted to the multiple pinion 16 via a zoom gear train 19.

Figure 4:
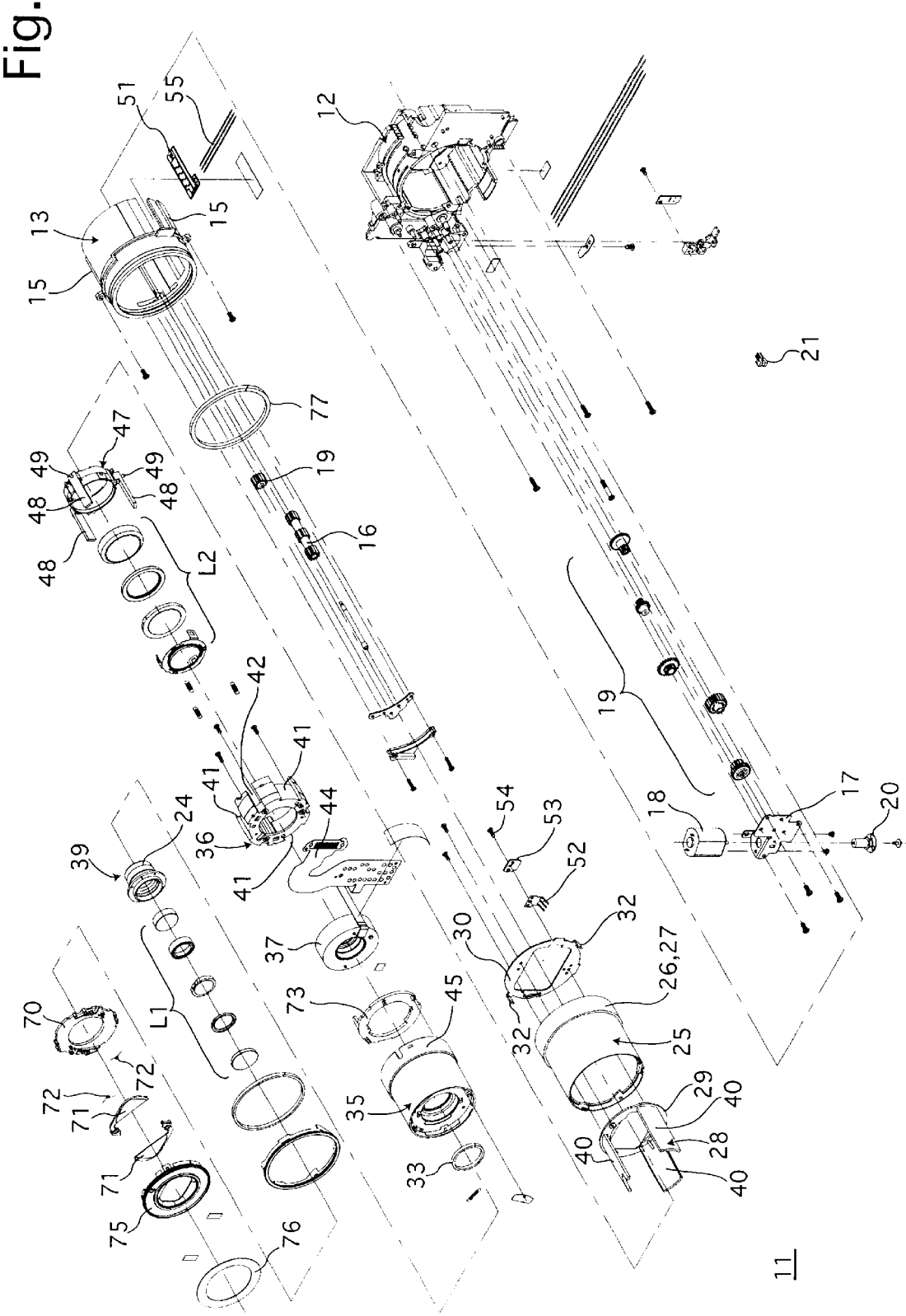
FIG. 4 is an exploded perspective view of a mechanical structure of a two-lens group type zoom lens to which a step zoom lens camera according to the present invention is applied, when a zoom lens barrel is in a retracted position.
Figure 5:
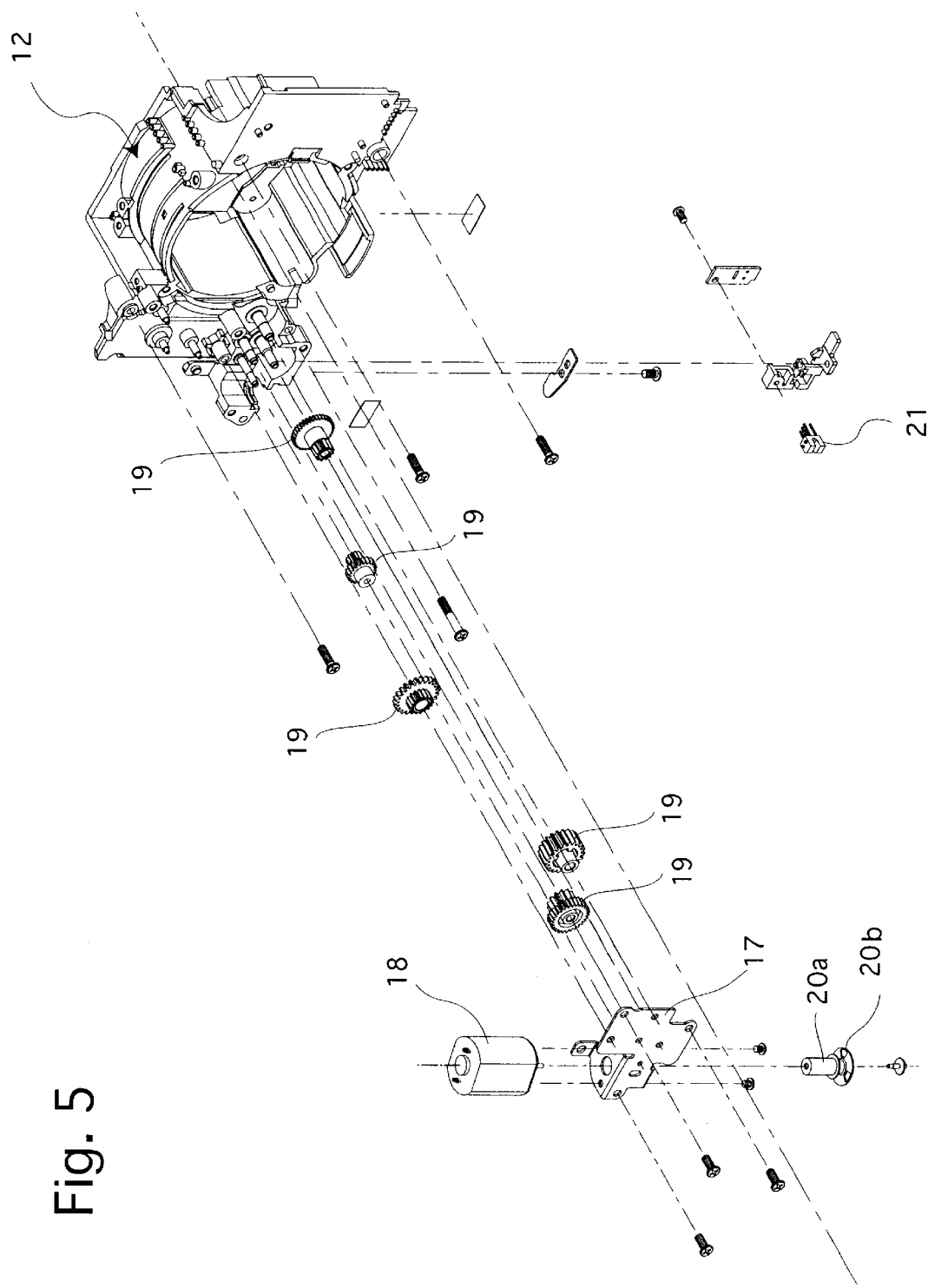
FIG. 5 is an enlarged exploded perspective view of a part of a zoom lens barrel shown in FIG. 4.

As shown in FIGS. 4 and 5, the zoom motor 18 is provided on its drive shaft with a worm gear 20*a* and a slit disc 20*b* secured thereto, having a plurality of slits, so that the amount of drive of the zoom motor 18 can be detected by detecting the amount of rotation of the slit disc 20*b* by a photo-interrupter 21. Since the amount of feed (forward movement) or retraction (rearward movement) of the zoom lens barrel 11 is determined in accordance with the amount of drive of the zoom motor 18, it is possible to pulse-control the angular displacement of a cam ring 25 which will be discussed hereinafter, via a pulse detection mechanism constructed from the slit disc 20*b* and the photo-interrupter 21.

The female helicoid 14 of the stationary barrel 13 is screw-engaged with a male helicoid 26 formed on the outer peripheral surface of the cam ring 25 in the vicinity of the rear end of the cam ring 25. The width of the male helicoids 26 in the optical axis direction is such that the male helicoid 26 is not exposed to the outside when the cam ring 25 is moved forward to a maximum position. The cam ring 25 is provided, on the peripheral surface thereof on which the male helicoid 26 is formed, with a plurality of outer peripheral gear portions 27 parallel with the male helicoid 26. The teeth of the outer peripheral gear portions 27 are parallel with the optical axis O and are engaged with the multiple pinion 16.

A linear movement guide ring 28 is provided in the cam ring 25. The linear movement guide ring 28 is provided on its rear end with a radially and outwardly extending flange 29. A linear movement guide plate 30 (see FIGS. 4, 6 and 9 through 11) is secured to the rear end of the linear movement guide ring 28. The linear movement guide ring 28 is connected to the cam ring 25 so as not to relatively move in the optical axis direction and so as to relatively rotate by holding an inner flange 31 (see FIG. 9) provided at the rear end of the cam ring 25 between the outer flange 29 and the linear movement guide plate 30.

The linear movement guide plate 30 is provided with a pair of linear movement guide projections 32 that are spaced in the circumferential direction and extend radially and outwardly. The respective linear movement guide projections 32 are slidably engaged in the linear movement guide grooves 15 formed in the stationary barrel 13. Consequently, the linear movement guide ring 28 and the linear movement guide plate 30 are moved together with the cam ring 25 in the optical axis direction but are not rotatable about the optical axis O relative to the stationary barrel 13. Namely, the linear movement guide ring 28 and the linear movement guide plate 30 are guided to move linearly.

The cam ring 25 and the linear movement guide ring 28 constitute a first feed portion of the zoom lens barrel 11. In the first feed portion, when the multiple pinion 16 is rotated by the zoom motor 18 in the lens feed direction, the cam ring 25 is rotated via the outer peripheral gear portions 27. Consequently, the cam ring 25 is moved forward from the stationary barrel 13 in accordance with the relationship between the female and male helicoids 14 and 26. At the same time, the linear movement guide ring 28 is moved in the optical axis direction together with the cam ring 25 while being guided to move linearly with respect to the stationary barrel 13, since the linear movement guide ring 28 and the cam ring 25 are connected to each other so as to be relatively rotatable.

As shown in FIGS. 4 and 9 through 11, lens support barrel (movable barrel) 35 is provided between the cam ring 25 and the linear movement guide ring 28. A shutter mount ring 36 is secured to the inside of the lens support barrel 35 and a shutter block 37 is secured to the front end of the shutter mount ring 36. The shutter block 37 is provided with a shutter drive motor 34 (FIG. 13) incorporated therein, to open and close shutter blades 38 (only one of which is shown in FIG. 9), so that the shutter blades 38 can be opened and closed in response to shutter opening and closing signals which are supplied from a CPU 60 (FIG. 13) through a flexible printed circuit (FPC) board 44 for the shutter.

The shutter block 37 supports a first lens group (focusing lens group) L1 via a first lens frame 39. The first lens frame 39 and the shutter block 37 are provided on the outer peripheral surface and the inner peripheral surface, respectively, with inter-engageable adjustment threads (mechanical adjusting device) 24, so that the first lens frame 39 can be adjusted in its axial position with respect to the shutter block 37 and the lens support barrel 35, via the adjustment threads 24. During the adjustment of the axial position of the first lens frame 39, it is possible to stably hold the position of the first lens frame 39 with a friction member 33 provided between the first lens frame 39 and the lens support barrel 35. When the position of the first lens frame 39 is determined, the first lens frame is adhered to the lens support barrel 35, for example, by an adhesive P (FIG. 9). Therefore, once the lens barrel is assembled, the first lens group L1 is secured to the lens support barrel 35 to move together therewith in the optical axis direction.

Figure 7:
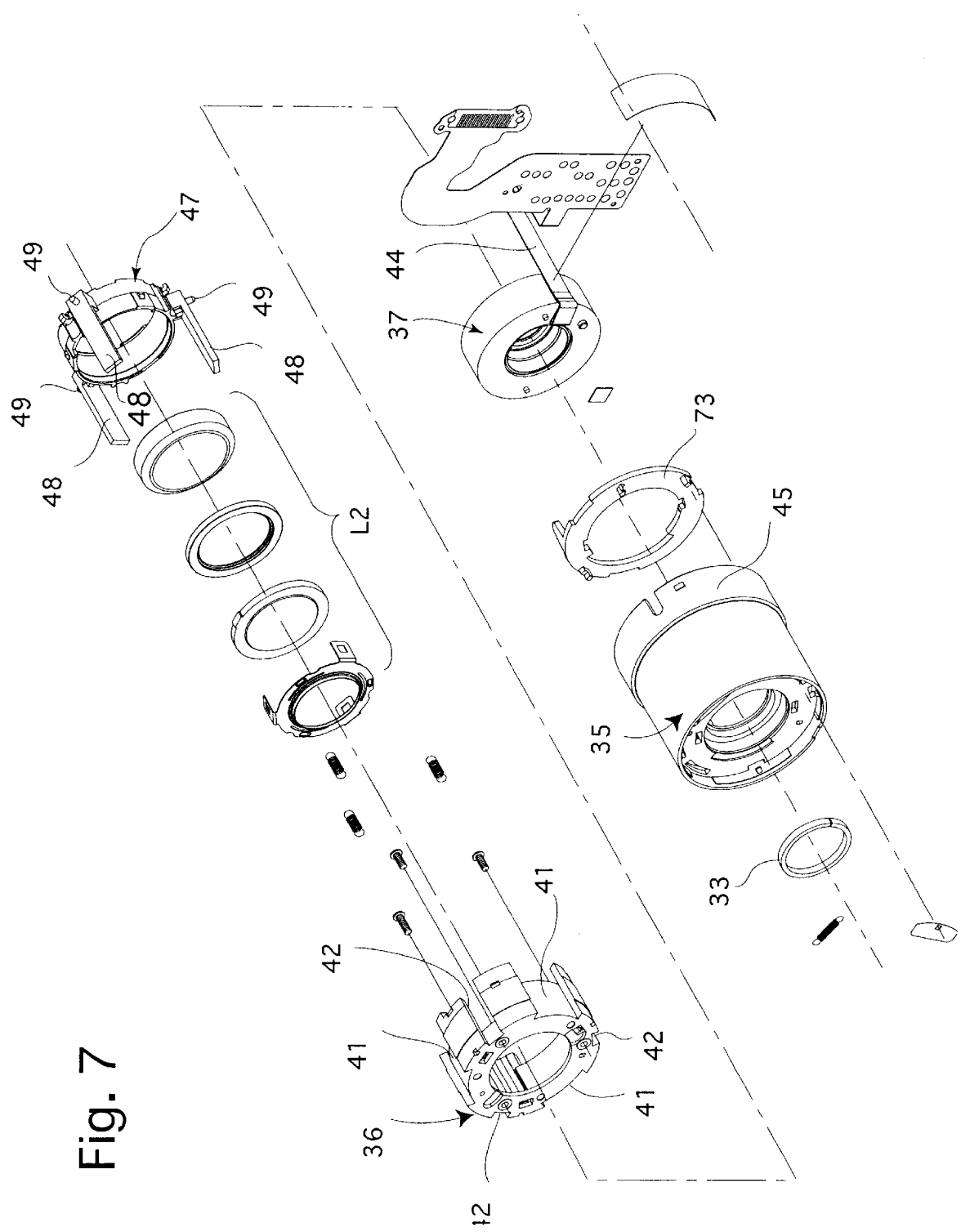
FIG. 7 is an enlarged exploded perspective view of a part of a zoom lens barrel shown in FIG. 4.

As can be seen in FIGS. 4 and 6, the linear movement guide ring 28 has three split and spaced cylindrical segments (linear movement guide portions) 40 arranged on an imaginary cylinder. As can be seen in FIGS. 4 and 7, the shutter mount ring 36 secured to the lens support barrel 35 is provided with three first and second linear movement guide grooves 41 and 42 that are alternately arranged in the circumferential direction and extend in parallel with the optical axis O. The three linear movement guide portions 40 of the linear movement guide ring 28 are respectively fitted in the first linear movement guide grooves 41. The shutter mount ring 36, the lens support barrel 35 and the shutter block 37 are guided to move linearly in the optical axis direction due to the engagement between the linear movement guide grooves 41 and the linear movement guide portions 40.

The lens support barrel 35 is provided, on its outer peripheral surface in the vicinity of the rear end, with a male helicoid 45 which is engaged with a female helicoid 46 formed on the inner peripheral surface of the cam ring 25. When the cam ring 25 rotates, the lens support barrel 35 which is guided to move linearly via the linear movement guide ring 28 is reciprocally moved in the optical axis direction relative to the cam ring 25 (first feed portion), due to the screw-engagement between the female and male helicoids 46 and 45. Namely, the lens support barrel 35 constitutes a second feed portion of the zoom lens barrel 11. The first lens group L1 is moved in the optical axis direction together with the lens support barrel 35.

Three linear movement guide portions 48 provided on a second lens frame 47 which holds the second lens group (adjusting lens group) L2 are fitted in the second linear movement guide grooves 42 of the shutter mount ring 36 to move in the optical axis direction. The second lens frame 47 is moved linearly due to the engagement between the linear movement guide portions 48 and the second linear movement guide grooves 42. The linear movement guide portions 48 of the second lens frame 47 are each provided with a radially and outwardly extending cam roller 49 which is fitted in a second lens guide cam groove 50 formed on the inner peripheral surface of the cam ring 25. The second lens guide cam grooves 50 are tapered with respect to the optical axis O, so that when the rotation of the cam ring 25 takes place, the second lens frame 47 which is guided to move linearly is moved reciprocally in the optical axis direction relative to the lens support barrel 35, due to the relationship between the second lens guide cam grooves 50 and the cam rollers 49. Namely, when the cam ring 25 rotates, the second lens group L2 is moved relative to the first lens group L1 in the optical axis direction, in accordance with the profile of the second lens guide cam grooves 50.

In a step zoom lens camera according to the embodiment of the invention, the first lens group L1 is moved in the optical axis direction along a linear path, in accordance with the angular displacement of the cam ring 25 via the helicoids 45 and 46. The second lens group L2 is guided by the second lens guide cam groove 50 so that the distance between the first and second lens groups is varied within each focal length step to vary the focal position thereof. The second lens guide cam groove 50 corresponds to the zooming cam groove Z2 described above with reference to FIG. 1.

Figure 12:
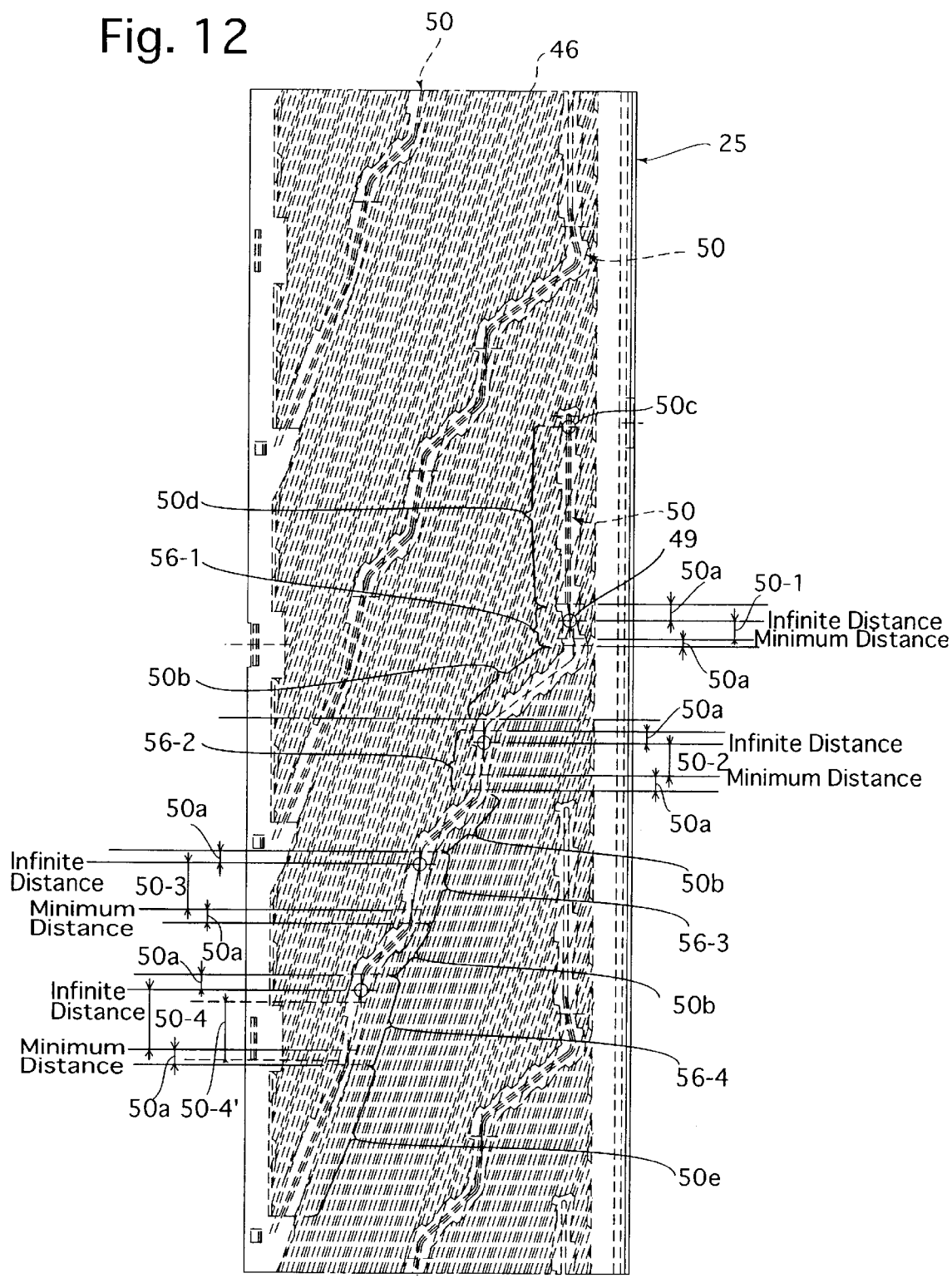
FIG. 12 is a developed view of a cam ring.

A developed view of the second lens guide cam groove 50 is shown in FIG. 12. The second lens guide cam groove 50 is provided with a non-linear path split into four steps in a zooming area from the wide angel extremity to the telephoto extremity. The step grooves 50-$i$ ($i$=1 to 4) are arranged in order from the wide angle extremity. The step grooves 50-$i$ provide paths which enable the second lens group L2 to move to a focal position of an object between the infinite distance ($\infty$) to the minimum distance (close-up) and are deviated from the above-mentioned imaginary zooming path.

The step grooves 50-*i* are each provided on the ends thereof with adjustment areas 50*a*. The adjustment areas 50*a* are formed to have a similar focusing function to the step grooves 50-*i*. So long as the opposed ends of the step grooves 50-*i* are moved within the adjustment areas 50*a*, the focusing operation in each step groove 50-*i* can be equally carried out. Specifically, if the basic step groove 50-4 is moved to a position indicated by 50-4', using the adjustment areas 50*a*, as shown in FIG. 12, a focusing operation can be equally carried out.

Namely, the second lens guide cam groove 50 including the step grooves 50-*i* and the adjustment areas 50*a* on opposite sides of the step grooves 50-*i* constitute the four step portions (effective cam groove area) 56-*i* (i=1 to 4), used in each corresponding focal length step. The step portions 56-*i* correspond to the step grooves Z2-*i* in FIG. 1 and the adjustment areas on opposite sides thereof and are provided with paths which enable the second lens group L2 to move so that the relationship between the angular displacement of the cam ring 25 and the displacement of the focal point of an object at infinity is linear.

There are also transfer areas 50*b* provided between the step portions 56-1, 56-2, 56-3 and 56-4. The transfer areas 50*b* connect the adjacent step portions 56-*i* and function to bring the step portions 56-*i* as close as possible to the imaginary zooming path. The second lens guide cam groove 50 has an accommodation area 50*c* which receives and guides therein the cam roller 49 when the lens barrel is retracted. There is also a transfer area 50*d* between the accommodation area 50*c* and the effective cam groove area 56-1 for the wide angle step. An introduction portion 50*e* is formed in front of the step portions 56-4 including the step groove 50-4 to introduce the cam roller 49 into the second lens guide cam groove 50.

The focal length steps from the wide angle extremity to the telephoto extremity and the retracted position (accommodation position) of the lens barrel can be detected in accordance with a change in the slide contact position of a code plate 51 secured to the inner surface of the stationary barrel 13 with a brush 52 secured to the linear movement guide plate 30 which is a component of the first feed portion, as finite stages of focal length data. The code plate 51 is connected to the CPU 60 through lead wires 55, so that when the slide contact position of the code plate 51 with the brush 52 is varied in accordance with the axial displacement of the linear movement guide plate 30 (first feed portion) relative to the stationary barrel 13, the focal length (step) can be detected. The brush 52 is secured to the linear movement guide plate 30 by a brush retainer 53 and a securing screw 54.

Figure 8:
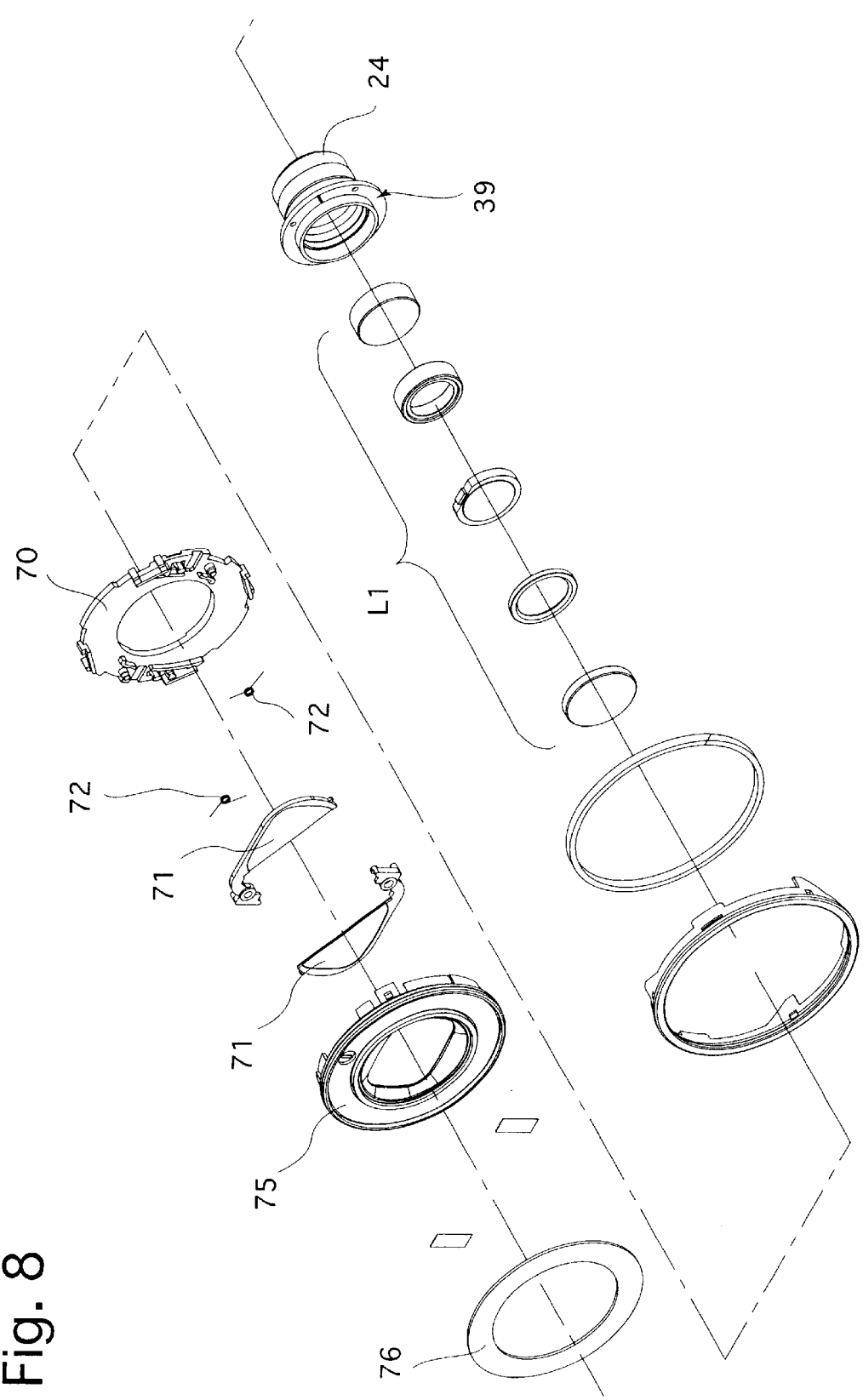
FIG. 8 is an enlarged exploded perspective view of a part of a zoom lens barrel shown in FIG. 4.

An opening and closing barrier mechanism which closes and opens the front opening of the first lens group L1 at the retracted position of the lens barrel and at the photographing position is provided at the front end of the zoom lens barrel 11. As shown in FIGS. 4 and 8, the opening and closing barrier mechanism is constructed from a pair of barrier blades 71 supported by the barrier mount 70 provided in the vicinity of the front end of the lens support barrel 35, barrier biasing springs 72 which bias the barrier blades 71 in the closed position, and a barrier drive ring 73. The barrier drive ring 73 rotates in accordance with the axial movement of the lens support barrel 35 of the zoom lens barrel 11 to thereby open or close the barrier blades 71.

A decorative plate 75 is provided in front of the lens support barrel 35 to cover the front portion of the opening and closing barrier mechanism. The decorative plate 75 is covered at the front surface thereof by a decorative ring 76. Another decorative ring 77 is attached to the front end of the cam ring 25. Moreover, the front end of the stationary barrel 13 is covered by a front cover 78 which is a component of the camera body (see FIG. 9).

Figure 13:
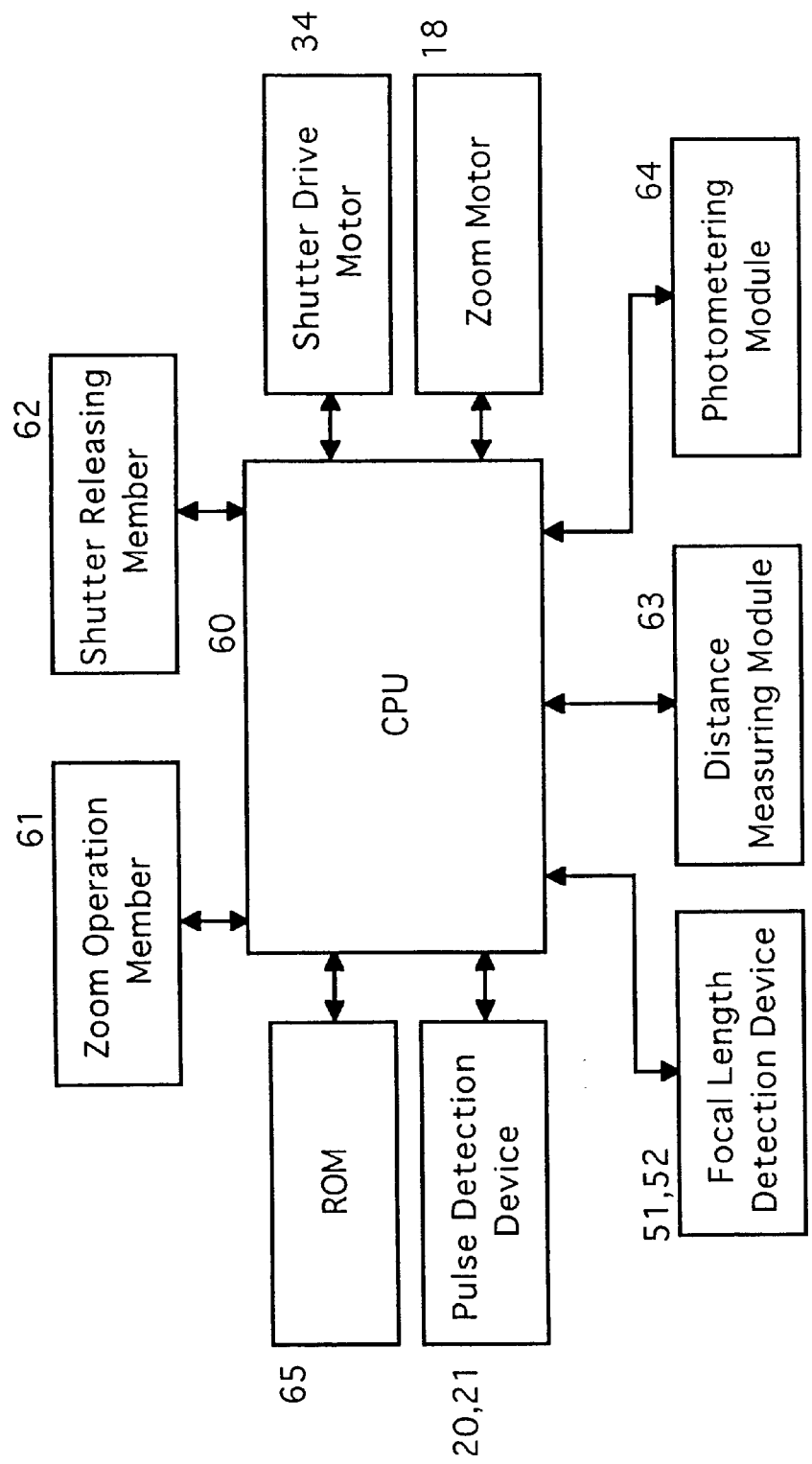
FIG. 13 is a block diagram of a control circuit system of a step zoom lens camera whose mechanical structure is shown in FIGS. 4 through 12.

As can be seen in FIG. 13, the zoom lens camera 10 includes a zoom operation member 61, a shutter releasing member 62, an object distance measuring module 63 and a photometering module 64. These elements are connected to the CPU 60. The zoom operation member 61 is actuated to supply a zooming command signal to move the zoom lens barrel 11 from the wide angle side to the telephoto side or from the telephoto side to the wide angle side. The shutter releasing member 62 is includes a release button which supplies a distance measuring command signal to the object distance measuring module 63 and a photometering command signal to the photometering module 64 when the release button is depressed by half step and actuates the shutter drive motor 34 of the shutter block 37 when the release button is depressed by full step. The shutter drive motor 34 opens the shutter blades 38 for a predetermined time in response to the brightness output from the photometering module 64. The ROM (EEPROM) 65 is connected to the CPU 60.

The ROM 65 has arithmetic formulae stored therein to calculate the angular displacement (number of pulses) of the cam ring 25 necessary to move the zoom lens system to the focal position between the infinite distance ($\infty$) to the minimum object distance (close-up). The formulae include factors necessary for the backfocus adjustment, in each focal length step, i.e., the number of pulses for the backfocus adjustment.

In this embodiment, the zooming adjustment is carried out by adjusting the position of the first lens group L1 in the optical axis direction upon assembly of the lens barrel. As mentioned above, the axial position of the first lens group L1 in the lens support barrel 35 can be adjusted via the adjusting screw 24. When adjustment is carried out, the first lens group L1 is moved in the optical axis direction with respect to the cam ring 25 which is held stationary. Consequently, the first lens group L1 is adjusted in the optical axis direction so that the focal point in each focal length step is identical, and thereafter, the first lens group L1 is adhered by an adhesive P. Thus the zooming adjustment is completed.

The zoom lens system of the step zoom lens camera operates as follows. When the zoom motor 18 is driven in the barrel feed direction from the retracted position shown in FIG. 9 or the wide angle extremity shown in Figure 10, the cam ring 25 is rotated and moved forward from the stationary barrel 13, so that the linear movement guide ring 28 is moved forward together with the cam ring 25 while being guided by the stationary barrel 13 to move linearly. When the cam ring 25 is rotated and moved forward, the lens support barrel 35 which is screw-engaged by the inner surface of the cam ring 25 via the helicoids 45 and 46, respectively, and is guided to move linearly, is moved forward together with the first lens group L1 in the axial direction. At the same time, the second lens group L2 which is guided by the second lens guide cam grooves 50 is moved in the lens support barrel 35 along a path different from that of the first lens group L1. Consequently, the first and second lens groups L1 and L2 are moved in the optical axis direction while varying the distance therebetween to carry out the zooming operation. When the zoom motor 18 is driven in the retraction direction from the telephoto extremity shown in FIG. 11, the zoom lens barrel 11 and the lens groups L1, L2 are moved in a direction opposite to the direction when the lens barrel is moved forward.

The focusing operation at each focal length step is controlled as follows. When the zoom operation member 61 is operated to carry out the barrel feed or retraction operation mentioned above, the code plate 51 and the brush 52 are brought into slide contact with each other to detect any one of the focal length steps. In the illustrated embodiment, the step detection position is located at a predetermined position on the retraction side (wide angle side) at each focal length step, so that a pulse counting reference position upon focusing is located slightly before the step detection position. Since the camera, to which the present invention is applied, is provided with a finder optical system (not shown) separate from the photographing optical system, focusing is not necessary upon a zooming operation. Therefore, when the zooming operation is released, the zoom lens barrel 11 is stopped at a stand-by position located in rear of the pulse counting reference position at each focal length step in the barrel retraction direction.

If the release button is depressed by a half step to perform the object distance measuring operation using the distance measuring module 63, the CPU 60 detects the object distance. Consequently, the angular displacement of the cam ring 25 to move the zoom lens system to a focal position of the object is calculated in accordance with an arithmetic formulae stored in the ROM by the CPU 60. Since the arithmetic formulae include the factors for the backfocus adjustment, the angular displacement of the cam ring 25 thus obtained by calculation includes the number of pulses necessary for the backfocus adjustment for the current focal length step. The angular displacement of the cam ring 25 thus obtained is compared with the angular displacement of the cam ring 25 at the pulse counting reference position. Consequently, the number of the drive pulses of the zoom motor 18 necessary to move from the reference position of the cam ring 25 to the angular position thereof corresponding to the focal position is determined.

If the release button is fully depressed, so that the ON signal is input from the shutter release member 62, the zoom motor 18 is driven to move the zoom lens barrel 11 in the feed direction (forward direction). Consequently, the number of pulses of the zoom motor 18 from the contact position of the brush 52 and the code plate 51, i.e., from the pulse counting reference position, is counted. The counting operation of the pulses is carried out using the slit disc 20b and the photo-interrupter 21. When the number of pulses previously obtained by calculation is detected, the zoom motor 18 is stopped to hold the zoom lens system in an in-focus position, and the shutter blades 38 are opened and closed by the shutter drive motor 34 to thereby take a picture. When the photographing operation is completed, the zoom lens barrel 11 is returned to the stand-by position for each focal length step. Consequently, the focusing operation including the focal point adjustment (backfocus adjustment) can be carried out by the zoom lens system. Note that although the focusing operation is carried out upon a shutter release operation in the illustrated embodiment, the mode of the focusing operation is not limited thereto. For example, it is possible to carry out the focusing operation when the object distance measurement is completed. Moreover, the stand-by position of the zoom lens barrel at each focal length step can be different from the stand-by position mentioned above.

In the focusing control mentioned above, since the step portions 56-i of the second lens guide cam groove 50 are formed so that the second lens group L2 is moved so as to have a linear relationship between the angular displacement of the cam ring 25 and the displacement of the focal position of an infinite distance object, the calculation upon backfocus adjustment can be easily carried out. Therefore, the burden of the CPU 60 in the focusing control can be reduced and the data to be stored in the ROM 65 can be reduced. If the burden of the control system is reduced, a less expensive CPU and/or memory can be used, thus resulting in a reduction of the manufacturing cost. Furthermore, if the control is easily carried out, a more reliable zoom lens can be obtained.

Since the backfocus adjustment is controlled by the CPU, a complex backfocus adjustment mechanism to move the whole zoom lens system in the optical axis direction is unnecessary. The zooming adjustment can be performed only by the adjustment of the position of the first lens group L1. Therefore, the mechanical focusing mechanism can be simplified, and thus, not only can the structure of the lens barrel be simplified but also the manufacturing cost thereof can be reduced.

As can be understood from the above discussion, according to the present invention, a reliable step zoom lens camera is achieved, in which the burden of the control system upon focusing or adjustments can be reduced and the focusing can be highly precisely carried out.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A step zoom lens camera having a zoom lens and a cam ring which is rotated to vary the focal length of the zoom lens, said cam ring being provided with a cam groove including a finite number of step portions which correspond to a plurality of focal length steps defined between a telephoto extremity and a wide angle extremity of the zoom lens, so that an object from an infinite distance to a closest distance can be focused on by changing the rotation angle of the cam ring in each said focal length step while varying the focal length of the zoom lens, said step zoom lens camera comprising:

a focusing lens group which serves also as a variable power lens group of said zoom lens, wherein said focusing lens group is moved in the optical axis direction, while keeping a linear relationship with respect to the rotation angle of the cam ring in each focal length step, in accordance with the rotation of the cam ring; and an adjusting lens group, serving also as another variable power lens group of said zoom lens, which is guided by the cam groove and is moved in the optical axis direction in a non-linear relationship with respect to the rotation angle of the cam ring in each focal length step, in accordance with the rotation of the cam ring;

wherein said step portions of said cam groove are each provided with a path which enables the adjusting lens group to move so as to provide a linear relationship between the rotation angle of the cam ring and amount of movement of the focal position of an infinite distance object.

2. The step zoom lens camera according to claim 1, wherein said cam groove is provided with a path which enables the adjusting lens group to move wherein a rotational angular displacement of the cam ring and the displacement of the focal position are equal in each of said focal length step portions.

3. The step zoom lens camera according to claim 1, wherein a position of said focusing lens group is adjustable in the optical axis direction, relative to the cam ring while the cam ring is stationary, so that a zooming adjustment to make the focal position equal in each focal length step is carried out by adjusting the position of the focusing lens group, and wherein the focusing lens group and the adjusting lens group are moved along predetermined paths in accordance with the rotation of the cam ring during the focusing operation, in order to perform a backfocus adjustment to thereby make the focal position equal to an image surface of said step zoom lens camera.

4. The step zoom lens camera according to claim 1, wherein said zoom lens comprises two lens groups including the focusing lens group and the adjusting lens group, wherein:

said focusing lens group comprises a front lens group located on the object side; and said adjusting lens group comprises a rear lens group located on the image surface side.

5. The step zoom lens camera according to claim 4, wherein a cam groove for guiding said adjusting lens group and a female helicoid are provided on inner peripheral surface of said cam ring, and wherein said focusing lens group is supported by a movable barrel having a male helicoid which is engaged with said female helicoid, said movable barrel being guided to move linearly in the optical axis direction.

6. The step zoom lens camera according to claim 5, further comprising a mechanical adjusting device for adjusting the position of the focusing lens group in the optical axis direction with respect to the movable barrel.

* * * * *